July 17, 1962 K. GEBELE ETAL 3,044,382
PHOTOGRAPHIC SHUTTER
Filed Dec. 8, 1958 2 Sheets-Sheet 1
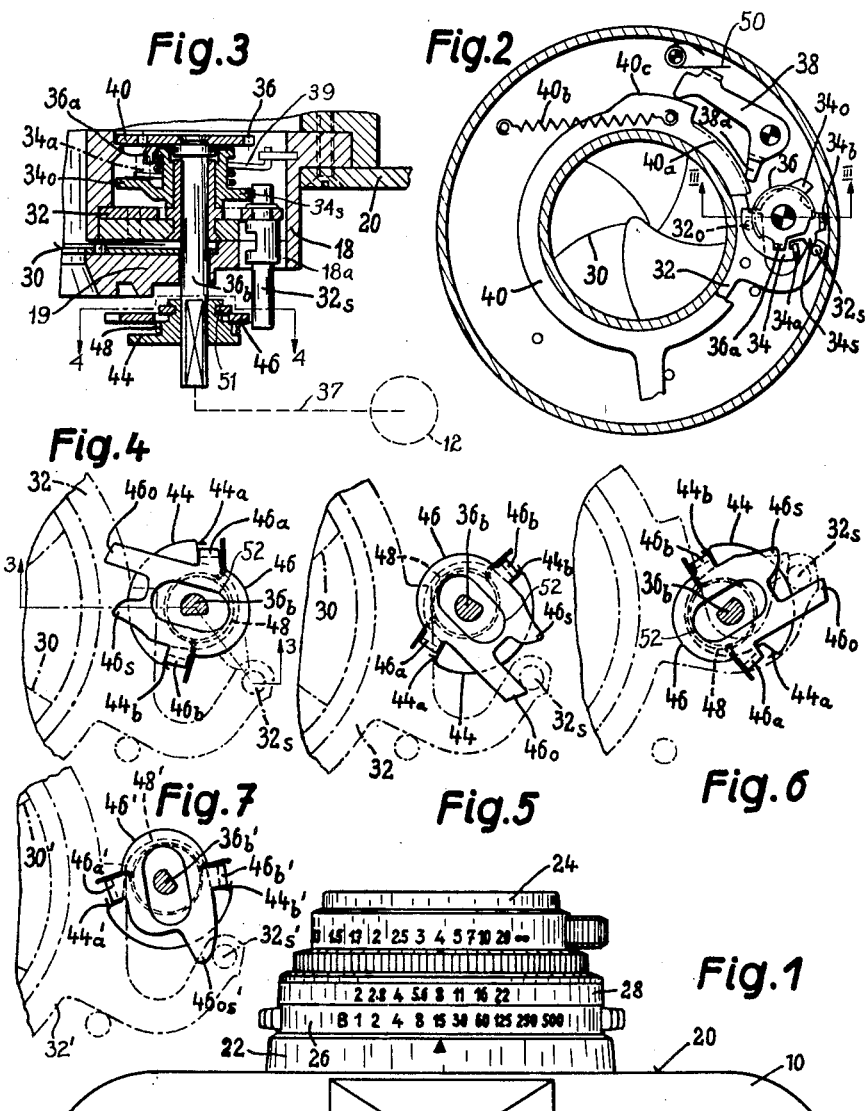
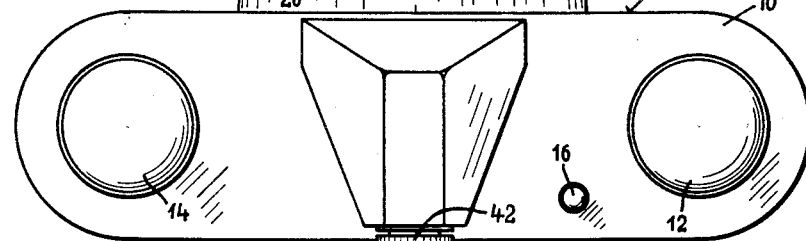

United States Patent Office 3,044,382
Patented July 17, 1962

3,044,382
PHOTOGRAPHIC SHUTTER
Kurt Gebele, Munich, and Ewald Spiessl, Deisenhofen, near Munich, Germany, assignors to Compur-Werk Friedrich Deckel, o.H.G., Munich, Germany, a German firm
Filed Dec. 8, 1958, Ser. No. 778,663
Claims priority, application Germany Dec. 14, 1957
9 Claims. (Cl. 95—63)

The present invention relates to a photographic shutter and, more particularly, to an auxiliary device for opening and closing the shutter blades prior to the picture-taking operation of the blades, for instance for the purpose of focusing.

An object of the invention is the provision of a generally improved and more satisfactory shutter wherein the shutter blades may be opened and closed before taking the picture without adversely affecting the accuracy of the shutter timing.

Another object is to provide a new and improved actuating mechanism for a shutter of the objective type arranged so that no extraneous spring forces act directly on the shutter blade drive member or master member as the shutter blades are opened and closed between picture-taking operations as, for example, while focusing.

Still another object is the provision of a shutter having no spring acting on the blade ring in a direction to close the blades, and having simple and rugged mechanism for opening and closing the blades for focusing between successive exposures.

Yet another object is the provision of a new and improved yieldable auxiliary device for a shutter for operating the shutter blades between picture-taking operations, the mechanism preferably being connected to the shaft carrying the master member and being relatively simple in structure.

These and other desirable objects may be attained in the manner disclosed as an illustrative embodiment of the invention in the following description and in the accompanying drawings forming a part hereof, in which:

FIG. 1 is a top view of a typical camera equipped with a shutter in accordance with the present invention;

FIG. 2 is a transverse cross sectional view of the shutter, various parts being omitted and other parts being partially cut away, the shutter being illustrated in its run-down or rest position at the conclusion of making an exposure;

FIG. 3 is a fragmentary radial cross sectional view of the shutter of FIG. 2 taken approximately on the lines 3—3 of FIGS. 2 and 4, the front of the camera being at the top of FIG. 3.

FIG. 4 is a transverse cross sectional view of a portion of the shutter taken approximately on the lines 4—4 of FIG. 3, the auxiliary shutter blade opening and closing device being shown in top view, one of the projections of the device being shown in dotted lines in an intermediate position, the shutter blades and blade ring and stop therefor also being shown in dotted lines;

FIG. 5 is a view similar to FIG. 4 showing the auxiliary shutter blade opening and closing device in an intermediate position;

FIG. 6 is a view similar to FIGS. 4 and 5 showing the auxiliary shutter blade opening and closing device in its shutter blade full opening position;

FIG. 7 is a view similar to FIG. 5 showing a modified form of the auxiliary shutter blade opening and closing device, an auxiliary projection which may be attached to the device being shown in dotted lines.

The same reference numerals throughout the several views indicate the same parts.

Figure 8:
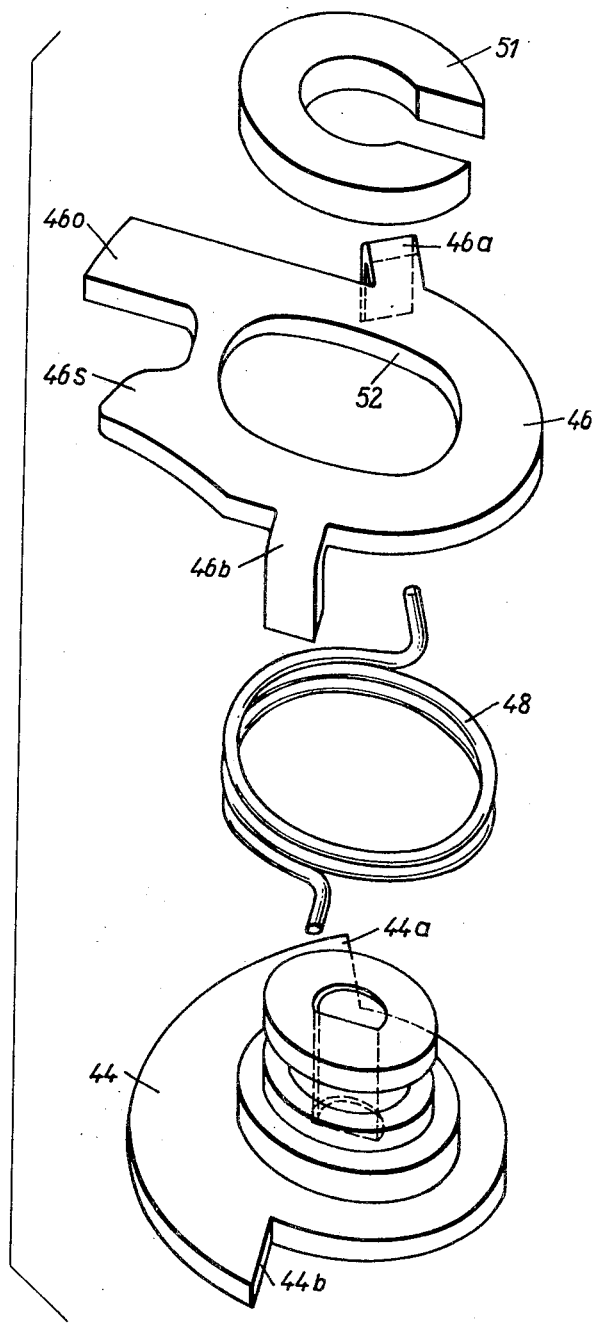
FIG. 8 is an exploded view of the principal parts of the auxiliary shutter blade opening and closing device, on an enlarged scale.

The auxiliary shutter blade opening or closing device according to the present invention may be used in cameras and shutters of various types. As the purpose of the auxiliary device is to permit opening and closing of the shutter blades before or between a picture-taking or exposure taking operation of the shutter, the device is advantageously used in a single lens reflex camera, and will be described with regard to such use in the preferred embodiment. It is to be understood, however, that the auxiliary opening device is applicable to cameras of other types, such as for instance a ground-glass plate camera or the like. The preferred embodiment will furthermore be described with regard to an objective shutter of the type in which both the cocking or tensioning of the shutter and the release or triggering thereof are accomplished through a single shaft extending rearwardly from the shutter to the camera body with which the shutter is used. It will again be understood, however, that the device may be used with other shutter arrangements in analogous manner.

Accordingly, the camera 10 shown in FIG. 1 is preferably a single lens reflex camera having a film winding knob 12, a rewind knob 14, and a shutter release 16. The film winding knob 12 is desirably of the type which cocks and tensions the shutter as the film is transported to the wind-on spool. The camera 10 also includes, though not here shown, a reflex mirror of the conventional kind which is swung upon the film transport and cocking motion into the ray path, this mirror deflecting the beam of light and throwing it by a prism device or the like onto a viewfinder 42. This intermediate observation is necessary for focusing and composing the picture and can, of course, only be effected with the shutter blades and diaphragm leaves opened.

At the front of the camera 10 is provided an objective type shutter indicated in general at 18 having its outer cylindrical housing fastened to the front 20 of the camera as by being screwed thereto in the manner shown in FIG. 3. The rear wall of the shutter housing or casing is shown at 19. To the front 20 is also fastened in any suitable manner a holding ring 22 which carries a lens unit 24 in an appropriate manner. Around the holding ring 22 are rotatably supported a pair of setting rings 26 and 28 of any suitable type for setting the shutter speed and the diaphragm aperture. The exact details of the diaphragm leaves and their connection with the appropriate setting ring are not important for purposes of the present invention, and the diaphragm itself may be installed either in the shutter or in the lens unit.

The shutter 18 is provided with shutter blades 30 which are actuated between closed and open positions by means of a clockwise and counterclockwise moving blade drive ring 32. The blade ring 32 is driven in known manner by a spring loaded main drive member or master member 34 of known construction, the master member being tensioned by a tensioning disk 36 secured to the forward end of a tensioning or cocking shaft 36b. A shutter blade arrangement and actuating mechanism of this type is disclosed in the patent to Gebele et al., No. 2,849,938, issued September 2, 1958, and reference may be made to this patent for more complete details than those given in the brief description to follow, but such additional details are not needed for an understanding of the invention by those skilled in this art. The blade ring 32 of this application corresponds to the blade ring 140 of the patent, the master member 34 of the present application corresponds to the master member 118 in the patent, the present tensioning disk 36 corresponds to the tensioning disk 22 of the patent, and the present tensioning shaft 36b corresponds to the tensioning shaft 20 of the mentioned patent. The manner in which the master member drives the blade ring is further described in greater detail in the patent to Singer, No. 2,785,612, issued March 19, 1957.

As will be understood by referring to the above mentioned patents, the master member 34 has a forwardly projecting lug 34a which is engaged by a rearwardly extending projection 36a on the tensioning disk 36 which engages the lug 34a when the tensioning shaft 36b is rotated in a counterclockwise direction to tension the shutter. It is understood that the tensioning shaft 36b extends rearwardly into the main body of the camera 10 and has a suitable operative connection with the winding-on knob 12 as indicated schematically at 37 in FIG. 3, by means of which the shutter is tensioned as the film is transported, for instance of the type disclosed in the first mentioned patent. The tensioning movement of the master member 34, of course, winds a main driving spring 39 similar to the spring 120 disclosed in the aforementioned Patent 2,849,938 or the spring 16 in the mentioned Patent 2,785,612. In the cocked position of the master member 34, the nose 38a of a bell-crank shaped locking lever 38 engages in the usual manner behind a projection 34b on the master member 34. Upon the running down of the master member in clockwise direction under the action of the main drive spring, an arm 34o on the master member first drives the blade ring 32 in a counterclockwise direction by striking and moving a pin 32o to cause the shutter blades 30 to open to expose the film strip. Subsequently, during the running down motion, another arm 34s on the master member comes into engagement with a drive pin 32s carried by an L-shaped arm on the blade ring 32 to move the blade ring back in a clockwise direction to close the blades 30.

For tensioning the main drive member or master member 34, the shaft 36b of the tensioning disk 36 is extended out the back of the shutter 18 and is coupled, as has been explained, with the film transport mechanism of the camera 10. A control ring 40, corresponding to the control ring 144 of the aforementioned Patent 2,849,938, is rotatably mounted in the shutter 18 in the same transverse plane as the tensioning disk 36 and is provided with outer peripheral gear teeth 40a which are in meshing engagement with peripheral gear teeth carried by the tensioning disk 36, so that during tensioning the control ring 40 is moved in a clockwise direction against the action of a return spring 40b. The tensioning disk 36 and the control ring 40 are held in cocked or tensioned position by a suitable locking arrangement of known form which can be disconnected in the familiar manner by the release 16, the details being unimportant for purposes of the present invention. For example, such details may be like the mechanism shown in FIG. 10 of the mentioned Patent 2,849,938. The control ring furthermore has an inclined cam surface 40c which cooperates with a projection on one end of the locking lever 38 to pivot the nose 38a out of engagement with the projection 34b on the master member 34, this disengagement occurring toward the end of the return motion of the control ring 40 to result in unlocking the master member. This projection of the one end of the locking lever 38 is constantly urged into engagement with the periphery of the control ring 40 by a spring 50 reacting against the shutter casing at one end.

As has been mentioned, the camera 10 in the preferred embodiment is a single lens reflex camera in which a reflex mirror is swung upon the film transport and cocking motion into this ray path, this mirror deflecting the beam of light and throwing it by a prism device of any suitable type into a viewfinder 42. This intermediate observation is necessary for focusing and composing the picture and can, of course, only be effected with the shutter blades and diaphragm leaves open. The mechanism for opening and closing the diaphragm leaves for in-between observations does not form part of the subject matter of the present invention, and the details of such a mechanism will not be described in detail here, since any suitable arrangement may be employed. The auxiliary device for opening and closing the shutter blades for intermediate observations is mounted in its preferred form on the tensioning shaft 36b rearwardly of the rear wall 19 of the shutter housing. The auxiliary device includes a drive disk 44 which is fixed to the rearwardly projecting end of the tensioning shaft 36b and has a forwardly extending hub on which is loosely mounted a push plate 46. The push plate 46 rests on a shoulder of the hub and is held against axial movement by a retaining ring 51, the ring 51 being secured to the hub at its inner periphery by extending into a groove in the hub. The plate 46 may also be called a blade operating member, since it serves to open the shutter blades at certain times, as explained below.

The drive disk 44 has two substantially radial drive projections 44a and 44b which are located approximately opposite one another, although preferably being somewhat less than 180 degrees apart. The push plate 46 is loosely mounted on the hub of the drive disk 44 and for this purpose has an elongated generally oval central opening 52, whereby the push plate has some freedom of movement relative to the drive disk 44. The push plate 46 has two rearwardly bent contact lugs 46a and 46b arranged to engage the respective radial projections 44a and 44b on the drive disk 44. These lugs and projections are resiliently positively coupled together by means of a spring 48 which surrounds the hub of the drive disk 44 and has substantially radially extending ends which engage the opposite edges of the lugs 46a and 46b to hold the lugs normally tight against the respective projections, thus to achieve the desired driving engagement.

The push plate 46 furthermore has two approximately radially extending spaced projections 46o and 46s, the lengths of which are approximately parallel to the length of the oval opening 52. These projections are arranged to engage successively the rear end of the blade ring drive pin 32s which is extended rearwardly through an arcuate slot 18a in the rear wall 19 of the shutter. For a reason to be apparent, the projection 46s is shorter than the projection 46o.

In operation, referring to FIGS. 4, 5, and 6, the operator turns the winding knob 12 to change frames, thus turning the tensioning shaft 36b in a counterclockwise direction. As can be seen in FIG. 4, the short projection 46s of the auxiliary shutter blade opening and closing device initially clears the pin 32s as indicated in dotted lines. The projection 46o however, is somewhat longer so that it comes into engagement with the pin 32s as shown in FIG. 5, and drives the blade ring 32 in a counterclockwise direction to open the shutter blades 30 for intermediate observations. The previously mentioned lock, for instance the mechanism shown in FIG. 10 of the aforementioned Patent 2,849,938, holds the tensioning shaft 36b, the auxiliary device 44, 46, and the control ring 40 in cocked or open position as illustrated in FIG. 6.

After actuation of the release 16, the tensioning disk 36 runs down in a clockwise direction. The projection 46s of the push plate 36 travels in a clockwise direction out of the position shown in FIG. 6 and comes into engagement with the pin 32s to move the blade ring 32 in a clockwise direction, thereby closing the shutter blades 30. The reflex mirror at the same time is swung again out of the ray path by a suitable mechanism not described here in detail. After the blades 30 have closed, towards the end of the running down motion, the control ring 40 has moved to the point where its inclined cam surface 40c disengages the locking lever 38 by pivoting the nose 38a out of engagement with the projection 34b on the master member. The master member now runs down and moves the blade ring 32 first in an opening direction by means of the projection 34o striking the pin 32o, and then in a closing direction by means of the projection 34s striking the outer end of the pin 32s, thus carrying out the exposure.

As has been mentioned, the push plate 46 is resiliently coupled to the drive disk 44, so that the spring lock between the lugs 46a and 46b and the radial drive projections 44a and 44b may disengage for a short time, such as during the movement of the blade ring or as the projections 46o and 46s slide past the pin 32s. This disengagement may take place as the operator turns the winding-on knob 12 or after the shutter release 16 is operated, the arrangement being such that some degree of freedom is allowed in dimensioning the parts of the auxiliary device and in positioning the blade ring pin 32s. The spring 48, of course, immediately reestablishes the coupling of the push plate 46 and the drive disk 44 should this disengagement occur. Moreover, this resilient connection is useful in enabling the shaft 36b and tensioning disk 36 to turn a little beyond the normal fully tensioned position, to insure that the latching nose 38a will drop behind the latching shoulder on the tensioning disk; then the parts can drop back a little (when the force on the winding knob 12 is relaxed) but the arm 46o will still hold the shutter blades fully open, due to the resilient "lost motion" connection.

In FIG. 7 a modified form of the auxiliary shutter blade opening and closing device is illustrated. This form is similar to the preferred embodiment in that it comprises a drive disk secured to the tensioning shaft 36b', and a loosely mounted push plate 46' which is resiliently coupled with the drive disk 44' by a spring 48', but has a positively limited range of lost motion relative to the disk. The construction to this point is the same as the construction shown in FIGS. 4 to 6. In this case, however, the push plate 46' has a single projection 46os', which cooperates with the pin 32s in both directions so as to both open and close the blade ring 32'.

The operation of the modified form of FIG. 7 is substantially the same as that of the preferred embodiment. The sole difference in operation occurs in the fact that one side of the projection 46os' engages the pin 32s' when the rewind knob 12 is operated and the tensioning shaft 36b is initially turned in a counterclockwise direction. When the shutter release 16 is operated, the other side of the projection 46os' strikes the pin 32s' to move the blade ring 32' back to a position in which the shutter blades 30' are closed.

The essential advantage of the two modifications of the auxiliary shutter blade opening and closing device as described is that the arrangement in accordance with the invention does not allow any spring force to act directly on the blade drive ring 32 or 32' during the opening or the opening and the closing motion for the intermediate observations. Therefore, such spring forces will not operate in opposition to the main spring of the shutter during the exposure process proper, so that the main drive spring may give off its full force only to the opening and closing movement of the shutter blade ring 32 or 32'. A more accurate shutter timing results.

Another advantage of the invention is that the auxiliary shutter blade opening and closing device may be manufactured of only a few simple parts, whereby it may be conveniently and economically manufactured. The component parts of the device are essentially flat, and thus are space saving and may be compactly incorporated into a camera.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic shutter including a plurality of shutter blades, a shutter blade drive ring operatively connected to said shutter blades and having a drive pin, a master member for operating said blade ring to open and close said shutter blades to take an exposure, a tensioning shaft for mounting said master member, a tensioning member carried by said tensioning shaft for tensioning said master member, and an auxiliary shutter blade opening and closing device, characterized by the fact that said device comprises a drive member secured to said tensioning shaft, and a push member mounted on said tensioning shaft and resiliently coupled to said drive member for limited lost motion relative thereto, said push member having at least one projection arranged to engage said drive pin and open said shutter blades as said tensioning shaft is being rotated to move said master member to a tensioned position.

2. A construction as defined in claim 1 including spring operated means for rotating said tensioning shaft in the opposite direction from a tensioned position, said projection being arranged to close said shutter blades before said master member is released for the exposure taking operation.

3. A construction as defined in claim 1 wherein said drive member is a disk having two substantially radial projections and said push member is a plate having two bent lugs arranged to engage said radial projections, and the resilient coupling is accomplished by a spring surrounding said tensioning shaft and urging said lugs and projections into resiliently positively coupled engagement.

4. A construction as defined in claim 2 wherein said tensioning shaft extends rearwardly out of the housing of said shutter and said auxiliary device is mounted on the rear end of said tensioning shaft outside of the housing, and means defining an arcuate slot in the housing through which said drive pin extends.

5. A photographic shutter including a plurality of shutter blades, a shutter blade drive ring operatively connected to said shutter blades and having a drive pin, a master member coacting with said drive pin for operating said blade ring during the cycle of opening and closing said shutter blades to take an exposure, a tensioning member for tensioning said master member, and an auxiliary device for opening and closing said shutter blades for focusing purposes, said auxiliary device comprising a drive member mounted at the rear of said master member, a push member resiliently coupled to said drive member for limited lost motion relative thereto, said push member having at least one projection arranged to engage said drive pin on said shutter blade drive ring to open said shutter blades for focusing purposes as said drive member is being operated to move said shutter blade driving ring.

6. A photographic shutter including a plurality of shutter blades, a shutter blade drive ring operatively connected to said shutter blades and having a drive pin, a master member coacting with said drive pin for operating said blade ring during the cycle of opening and closing said shutter blades to take an exposure, a tensioning member mounted at the rear of said master member and movable for tensioning said master member, and an auxiliary device for opening and closing said shutter blades for focusing purposes, said auxiliary device comprising a drive member fixed to said tensioning member, a push member resiliently coupled to said drive member for limited lost motion relative thereto, said push member having at least one projection arranged to directly engage said drive pin on said shutter blade drive ring to open said shutter blades for focusing purposes as said tensioning member is being operated to move said master member to a tensioning position.

7. A photographic shutter of the type including a shutter housing adapted to be mounted on a camera and to be controlled from parts on the camera, shutter blades mounted in said housing for movement between closed and open positions, a rotatable blade ring operatively connected to said blades to move them between said positions upon rotating of said blade ring, a spring actuated rotatable master member mounted in said shutter housing for movement between a tensioned position and a run-down position and effective during movement from tensioned position to run-down position to turn said blade ring first in one direction and then in an opposite direction to open and close said blades for making an exposure, and a control shaft coaxial with said master member and effective upon rotation in one direction to move said master member to tensioned position and effective upon rotation in an opposite direction to initiate a running-down movement of said master member, said control shaft being mounted at least partly in said shutter housing and extending rearwardly from the shutter housing into the camera on which the shutter housing is mounted, to be turned by mechanism within the camera, characterized by a blade operating member mounted on and resiliently coupled to said control shaft to turn therewith, said operating member having a portion for engaging said blade ring to move said blades to open position upon rotation of said control shaft in a direction to tension said master member and to move said blades back to closed position upon rotation of said control shaft in the opposite direction and prior to initiating a running-down movement of said master member.

8. A photographic shutter of the type including a shutter housing adapted to be mounted on a camera and to be controlled from parts on the camera, shutter blades mounted in said housing for movement between closed and open positions, a rotatable blade ring operatively connected to said blades to move them between said positions upon rotation of said blade ring, a spring actuated rotatable master member mounted in said shutter housing for movement between a tensioned position and a run-down position and effective during movement from tensioned position to run-down position to turn said blade ring first in one direction and then in an opposite direction to open and close said blades for making an exposure, and a control shaft coaxial with said master member and effective upon rotation in one direction to move said master member to tensioned position and effective upon rotation in an opposite direction to initiate a running-down movement of said master member, said control shaft being mounted partly in said shutter housing and extending rearwardly from the shutter housing into the camera on which the shutter housing is mounted, to be turned by mechanism within the camera, characterized by operating means mounted on and turning with said control shaft for turning said blade ring to move said blades to open position by the act of rotating said control shaft in a direction to tension said master member and for turning said blade ring in an opposite direction to move said blades to closed position by the act of rotating said control shaft in an opposite direction to initiate a running-down movement of said master member but prior to the initiation thereof, and further characterized by the fact that said blade ring is free of any spring force opposing action of said operating means and said master member in opening and closing said blades.

9. A photographic shutter of the type including movable shutter blades, a blade ring mounted for rotary movement and operatively connected to said blades to open the blades upon rotation of said ring in one direction and to close the blades upon rotation of said ring in an opposite direction, a master member mounted for rotation about a rotary axis offset from the axis of rotation of said blade ring, said master member being rotatable in one direction from a rest position to a tensioned position and rotatable in an opposite direction from tensioned position to rest position and being effective during rotation in said opposite direction to turn said blade ring first in a blade-opening direction and then in a blade-closing direction, latch means for latching said master member in tensioned position, and a control shaft mounted for rotation coaxially with said master member, said control shaft being effective upon rotation in a first direction to rotate said master member from its rest position to its tensioned and latched position and being effective during the latter part of rotation in a second direction to unlatch said latch means so that said master member may turn in its said opposite direction to open and close said blades for making an exposure, said shutter being characterized by a pin on said blade ring, a blade operating member mounted on said control shaft and having two arms for engaging said pin on said blade ring, one of said arms being longer than the other, and resilient means connecting said operating member to said control shaft to tend to rotate therewith, said arms on said operating member being so placed with relation to said pin that when said control shaft is rotated in its said first direction, the longer one of said arms will engage said pin and rotate said blade ring in blade-opening direction, and when said control shaft is rotated in its said second direction, the shorter one of said arms will engage said pin during the first part of rotation of said control shaft in its second direction and will rotate said blade ring in blade-closing direction and then will slip past said pin so as to be in non-obstructing relation to said pin so that when continued rotation of said control shaft in its second direction unlatches said latch means, said master member may rotate to move said blade ring to make an exposure without obstruction by either of said arms.

References Cited in the file of this patent
UNITED STATES PATENTS

| | | |
|---|---|---|
| 2,354,168 | Aiken | July 18, 1944 |
| 2,655,847 | Harvey | Oct. 20, 1953 |
| 2,730,025 | Faulhaber | Jan. 10, 1956 |
| 2,925,764 | Sauer et al. | Feb. 23, 1960 |